J. L. KUNZ.
AUTOMOBILE WHEEL.
APPLICATION FILED SEPT. 22, 1916.
1,237,065.
Patented Aug. 14, 1917.
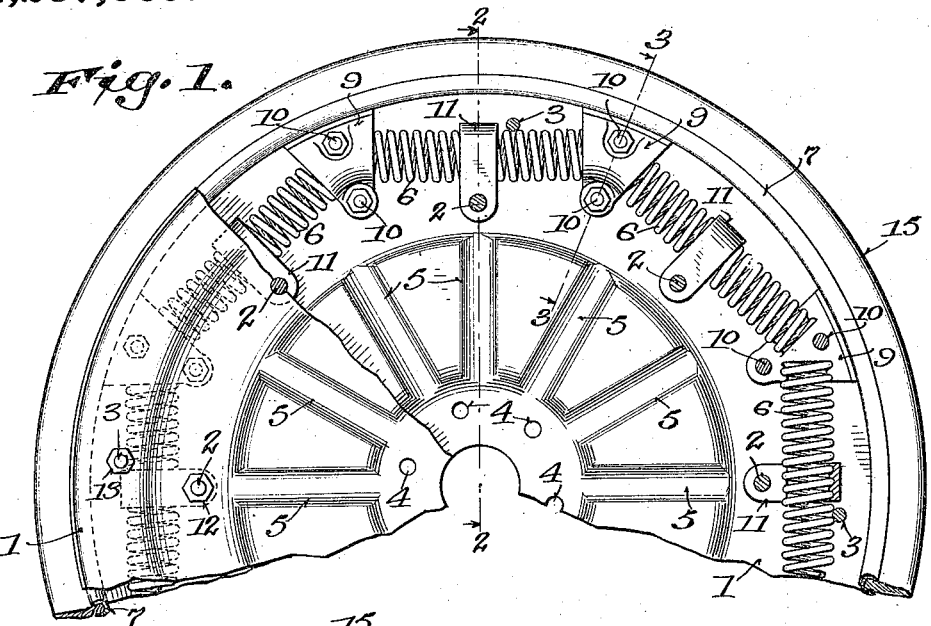
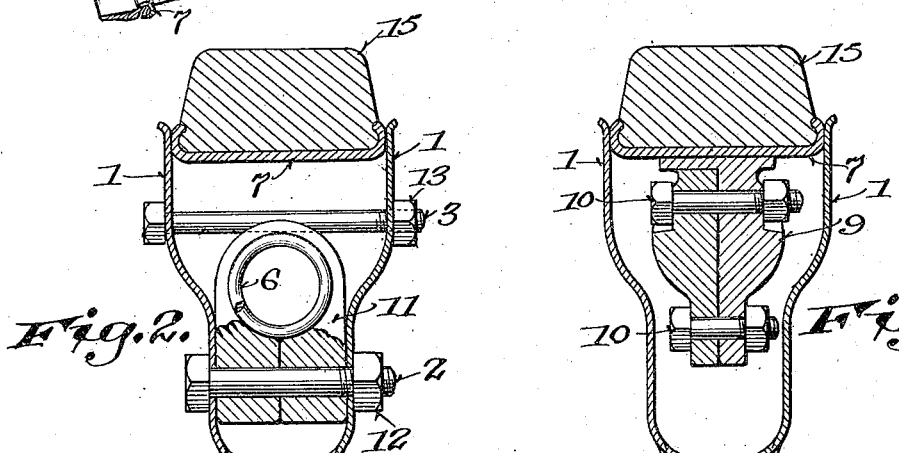
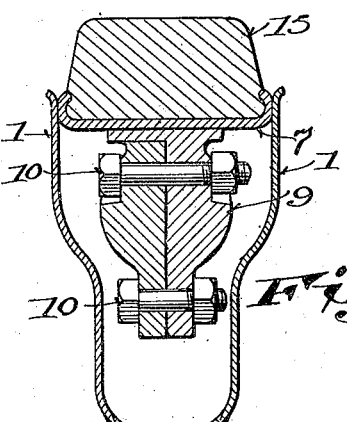
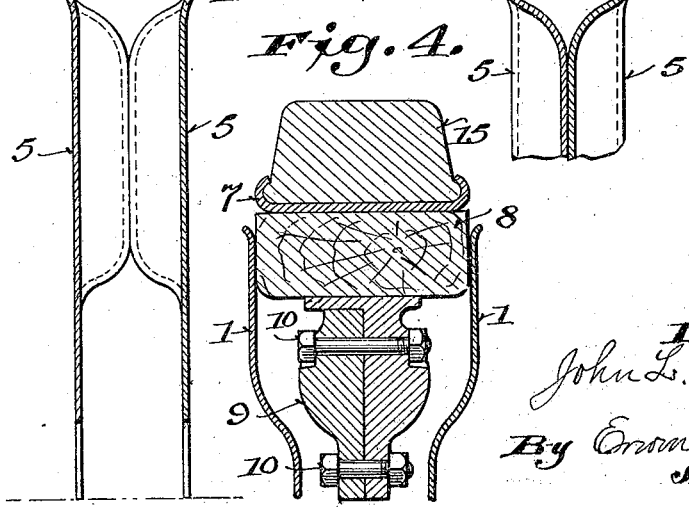
Inventor
John L. Kunz
By Erwin & Whider
Attorneys.

UNITED STATES PATENT OFFICE.

JOHN L. KUNZ, OF MILWAUKEE, WISCONSIN, ASSIGNOR, BY DIRECT AND MESNE ASSIGNMENTS, TO KUNZ WHEEL CO., OF MILWAUKEE, WISCONSIN, A CORPORATION OF WISCONSIN.

AUTOMOBILE-WHEEL.

1,237,065.  Specification of Letters Patent.  Patented Aug. 14, 1917.

Application filed September 22, 1916. Serial No. 121,543.

*To all whom it may concern:*

Be it known that I, JOHN L. KUNZ, a citizen of the United States, residing at the city of Milwaukee, county of Milwaukee, and State of Wisconsin, have invented new and useful Improvements in Automobile-Wheels, of which the following is a specification.

My invention relates to improvements in automobile wheels, and it pertains to that class in which the tires and wheel rims are yieldingly supported from the central portion of the wheel upon or by metallic springs.

I am aware of the fact that tires and wheel rims have been previously supported from metallic springs, and the invention herein is not predicated broadly upon such use of metallic springs, but instead the invention is herein predicated upon both the device herein shown for preventing a lateral or side movement of the tire and rim of the vehicle supported on said tire or rim, and the combination of such device with a series of springs.

My invention is further explained by reference to the accompanying drawing, in which—

Figure 1 represents a side view of a portion of a wheel embodying my invention, partly broken away to show the interior.

Fig. 2 is a vertical section, drawn on line 2, 2 of Fig. 1.

Fig. 3 is a vertical section drawn on line 3, 3 of Fig. 1, and

Fig. 4 is a modified form of the device shown in the other figures.

Like parts are identified by the same reference numerals throughout the several views.

The central portion of the wheel is preferably composed of two separate disks or metallic plates 1, 1, which are secured together near their outer edges by a plurality of bolts 2 and 3 and near their centers by a plurality of bolts which are inserted in the apertures 4 of said disks 1, and by which said disks are secured at their centers to the hub of the wheel, not shown. In striking up or forming the disks 1 they are preferably bent outwardly, as shown at 5, 5, whereby they resemble a series of spokes, as shown in Fig. 1. By thus bending the disks 1 outwardly, as shown, they are given greater strength. The outer ends of the disks 1 extend past the series of springs 6 and bear against the side of the felly 8, as shown in Fig. 4, and the rim 7, as shown in Figs. 1, 2 and 3. The ends of the springs 6 are connected with the rim 7 or felly 8 by a plurality of clamping members 9, and said clamping members are held tightly together around the ends of the springs 6 by a plurality of bolts 10, 10. The centers of the springs are connected with the disks 1 by a plurality of clamping members 11, and said clamping members and disks are clamped and retained in rigid contact with each other at the central portion of said spring by turning down the nut 12 on the bolt 2. Before inserting the springs 6 between said clamping members the nuts 12 are turned outwardly on the bolts 2, when said springs 6 are turned in the spiral grooves provided therefor in their centers, when said nuts 12 are turned down on said bolts, whereby said springs 6 are securely held in place between the respective sides of said clamping members 11.

In case of wear of the surfaces between the disks 1 and the parts against which they bear said disks are drawn toward each other by turning down the nut 13 on the bolt 3, whereby such wear, if any, as may occur between the rim 7 or felly 8 and the outer edges of the disks 1 may be readily taken up.

15 represents the tire which may be formed of solid rubber or other equivalent material.

Having thus described my invention what I claim as new and desire to secure by Letters Patent, is:—

1. In a device of the described class, the combination with the central portion and exterior portion of an automobile wheel, of a pair of radial disks, said disks being bolted to said central portion and extending outwardly past the inner edge of said exterior portion, said radial disks being adapted to retain said exterior portion and the central portion of said wheel in alinement with each other, and an annular series of spiral springs, said springs being interposed between and rigidly clamped to said disks.

2. In a device of the described class, the combination with the central portion and rim of an automobile wheel, of a pair of radial disks, said disks being connected with said central portion and extending outwardly, said disks being adapted to retain said rim and the central portion of said wheel in alinement with each other, and an annular series of spiral springs interposed between the central portion and the rim of said wheel, said springs being rigidly connected at their centers with said disk, and at their ends with the rim of said wheel.

3. In a device of the described class, the combination with the central portion and rim of an automobile wheel, of a pair of radial disks, said disks extending outwardly past the inner edge of said rim, and adapted to retain said rim and the central portion of said wheel in alinement with each other, and an annular series of spiral springs centrally clamped to said disks and interposed between said rim and the center of said wheel, said springs extending in a straight line from one of their ends to the other and connected at their respective ends with said rims.

In testimony whereof I affix my signature in the presence of two witnesses.

JOHN L. KUNZ.

Witnesses:
 JAS. B. ERWIN,
 ALICE J. McKERIHAN.

Copies of this patent may be obtained for five cents each, by addressing the "Commissioner of Patents, Washington, D. C."